United States Patent
Reinhart

(10) Patent No.: US 10,429,855 B1
(45) Date of Patent: Oct. 1, 2019

(54) METHOD OF DETERMINING GAP SPACING FOR VEHICLES IN PLATOONS

(71) Applicant: Southwest Research Institute, San Antonio, TX (US)

(72) Inventor: Thomas E. Reinhart, Boerne, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 15/933,926

(22) Filed: Mar. 23, 2018

(51) Int. Cl.
| | | |
|---|---|---|
| *B60T 8/32* | (2006.01) | |
| *G05D 1/00* | (2006.01) | |
| *G06F 7/00* | (2006.01) | |
| *G06F 17/00* | (2019.01) | |
| *G05D 1/02* | (2006.01) | |
| *B60K 11/06* | (2006.01) | |
| *B60W 30/16* | (2012.01) | |
| *B60K 11/04* | (2006.01) | |
| *G08G 1/00* | (2006.01) | |
| *B60R 22/00* | (2006.01) | |
| *E05F 15/00* | (2015.01) | |
| *G05D 3/00* | (2006.01) | |

(52) U.S. Cl.
CPC ............ *G05D 1/0295* (2013.01); *B60K 11/04* (2013.01); *B60K 11/06* (2013.01); *B60W 30/16* (2013.01); *G08G 1/22* (2013.01); *G05D 2201/0213* (2013.01)

(58) Field of Classification Search
CPC ...... G05D 1/0295; B60K 11/04; B60K 11/06; B60K 11/085; B60W 30/16; B60W 30/0953; G08G 1/22; G08G 1/161
USPC ....................................................... 701/93, 49
See application file for complete search history.

(56) References Cited

U.S. PATENT DOCUMENTS

| | | | |
|---|---|---|---|
| 8,649,941 B1 * | 2/2014 | Tsuda ................. | B60H 1/00771 701/49 |
| 9,616,743 B1 * | 4/2017 | Mays ................... | B60K 11/085 |
| 2017/0305419 A1 * | 10/2017 | Liebinger Portela ....................... | B60W 30/0953 |

\* cited by examiner

*Primary Examiner* — Mahmoud S Ismail
(74) *Attorney, Agent, or Firm* — Livingston Law Firm

(57) ABSTRACT

A method of determining the optimum vehicle gap distance for a vehicle in a platoon, the vehicle having a cooling fan and a coolant-based cooling system. The vehicle's vehicle control system determines a base gap distance, based on safety considerations related to platoon operation. A gap control process stores a fan turn-on threshold temperature, which is less than the coolant temperature that will result in the vehicle's cooling fan becoming activated. During vehicle operation, the gap control process receives a current coolant temperature value, and compares that value to the fan turn-on threshold temperature. If the coolant temperature is at or above the fan turn-on threshold temperature, the vehicle is operated to increase the base gap distance.

5 Claims, 4 Drawing Sheets

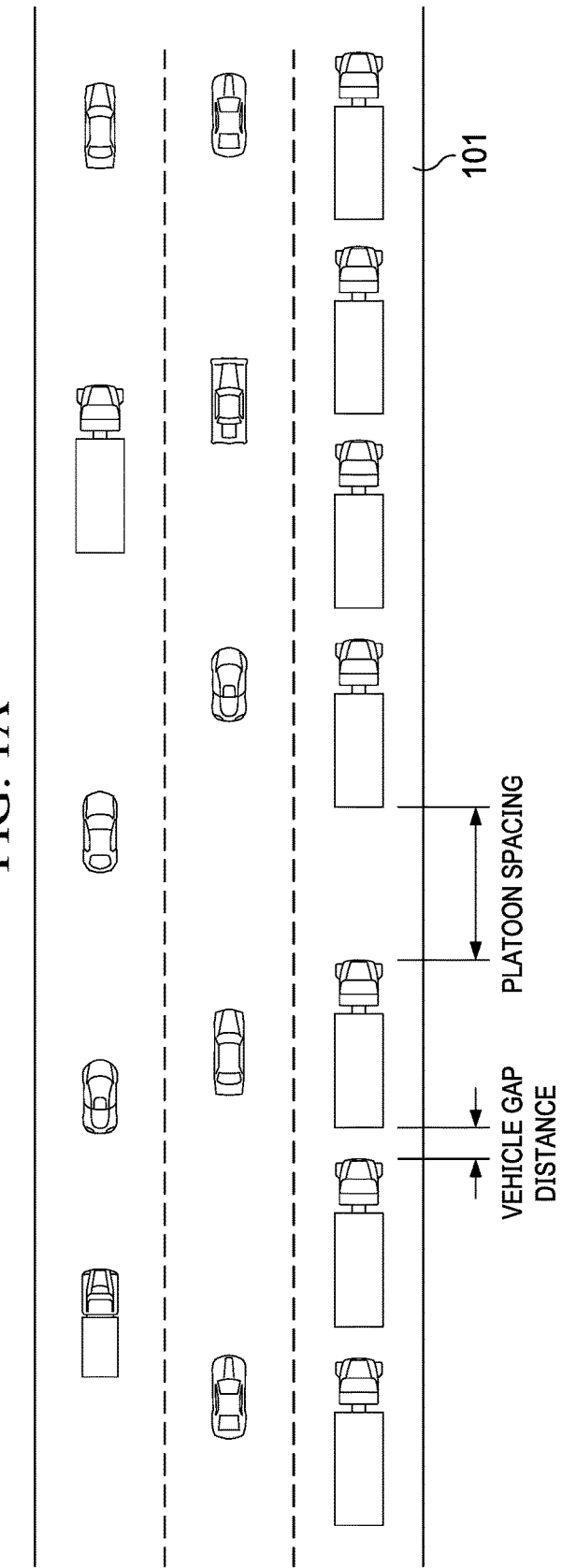

and more particularly to determining the optimal
gap spacing between the vehicles.

METHOD OF DETERMINING GAP SPACING FOR VEHICLES IN PLATOONS

TECHNICAL FIELD OF THE INVENTION

This invention relates to operating motor vehicles in platoons, and more particularly to determining the optimal gap spacing between the vehicles.

BACKGROUND OF THE INVENTION

Operating vehicles as a group, such as platoons (sometimes also called convoys) is not new, but has become an area of research for applications such as autonomous vehicles and automated highways. Platoons and convoys are familiar in military applications for a variety of vehicle types and terrain, but for roadway travel, research is more recent.

The general concept of a platoon of vehicles on a roadway is that the vehicles travel at a synchronized speed. The goal is to reduce traffic accidents, increase road capacity, and provide more efficient travel. The efficiency benefit results in part from reduced aerodynamic drag. When a vehicle operates in the wake of another vehicle, both vehicles experience a reduction in aerodynamic drag. This effect applies, at least to some extent, to all vehicle types from cars to large trucks.

The composition of a platoon need not be fixed. The platoon may include a wide variety of vehicle types and sizes. Vehicles can join and leave a platoon.

As compared to random traffic, platoons control the distances between vehicles by using automated control processes. This allows for a closer headway between vehicles by eliminating reaction distance needed for human response. This capability allows many cars or trucks to accelerate or brake simultaneously.

To optimize aerodynamic drag and thus fuel efficiency, a platoon should drive with very little gap between vehicles, such as one meter or less. However, other factors limit how close the spacing in a platoon can be. For example, the response time of vehicle controls and variations in braking capability must be taken into account, so that vehicles do not hit each other during acceleration, braking, or turning events. Safety considerations regarding human operated vehicles that that might attempt to insert themselves into a platoon may also limit how closely vehicles within a platoon can operate.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1A illustrates an example similar to that of FIG. 1, but with only semi-trucks in the platoon lane.

DETAILED DESCRIPTION OF THE INVENTION

The following description is directed to a method of determining gap spacing for vehicles traveling in a platoon. For purposes of this description, a "platoon" is defined as a group of vehicles traveling in single file. Typically, the vehicles will be traveling on a roadway, but other applications are possible.

Figure 1:
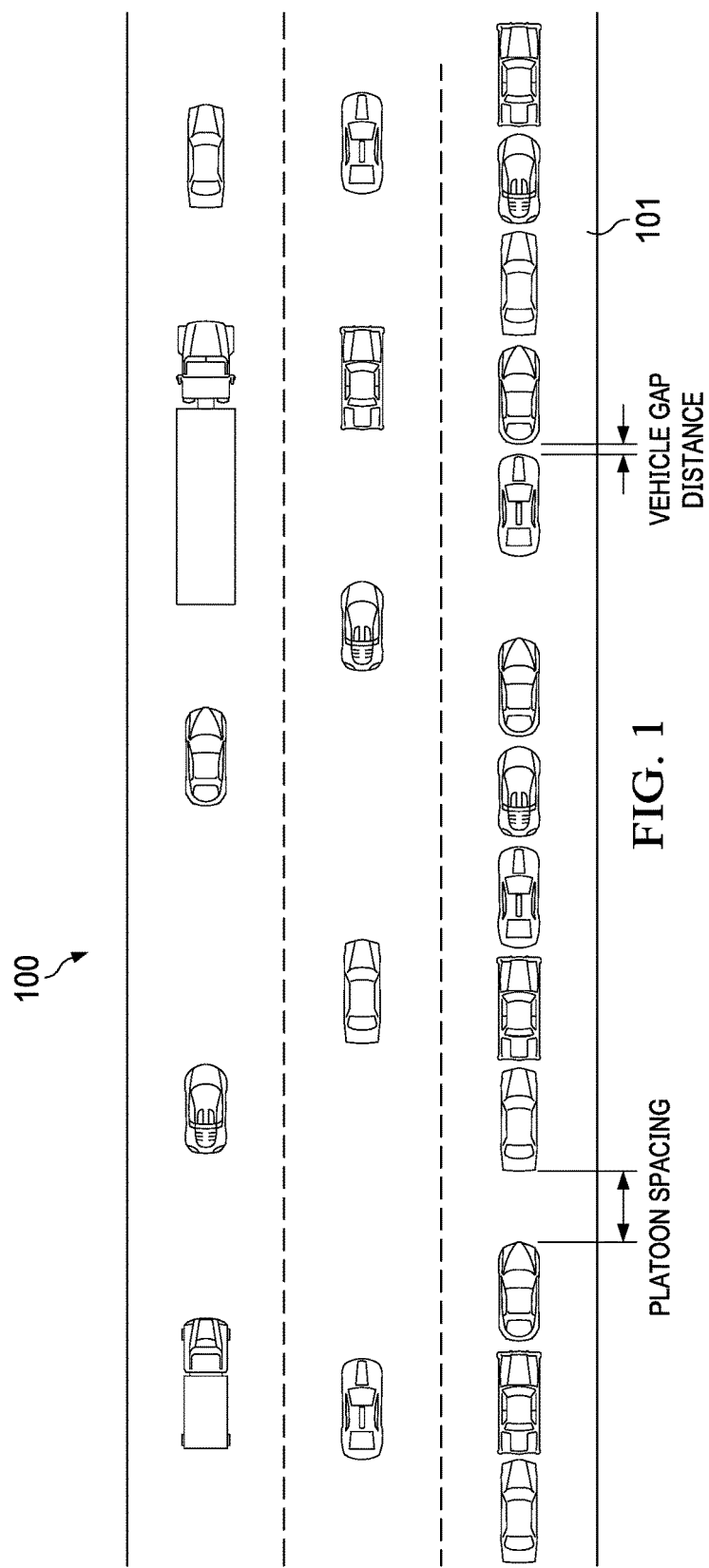
FIG. 1 illustrates an example of vehicles traveling in platoons on a roadway.

FIG. 1 illustrates a roadway 100 having three traffic lanes for motor vehicles, with one lane being a platoon lane 101. In platoon lane 101, one or more platoons of vehicles travel as a group in a single line. In the example of FIG. 1, there are two platoons of five vehicles and one platoon of three vehicles. The number of vehicles in an actual platoon may vary from any number of two or more.

For purposes of this description, it is assumed that the "motor vehicles" in the platoon lane 101 are of a type designed to travel on a roadway, such as an automobile, truck, bus, or similar motor-driven conveyance. The vehicles may have any type of powertrain, including internal combustion engines, electric motors, or hybrids. The motor vehicles in a platoon may or may not be of uniform size and type, that is, the platoon may be a "mixed vehicle" platoon.

FIG. 1A illustrates an example of platoons, similar to that of FIG. 1, but with only semi-trucks in the platoon lane 101. This is a likely application of the gap spacing method of the present invention.

Referring to both FIGS. 1 and 1A, each vehicle may or may not have a driver, and thus, all or some of the vehicles may be autonomous. The lead vehicle may or may not make executive decisions. For purposes of this description, the significant feature of each vehicle is a "vehicle gap distance control process" on board each vehicle, which controls the gap spacing between vehicles within a platoon.

The spacing between vehicles is referred to herein as the "vehicle gap distance". In general, as the gap distance decreases, the fuel economy benefit from platoon travel increases. However, vehicle spacing is constrained by safety considerations, and in particular, a vehicle's control system response time and accuracy.

The following description is directed to the recognition that heat generated by vehicle engines can be a significant factor in determining an optimum gap distance between vehicles. This is particularly true for heavier duty vehicles. As the gap distance decreases, the amount of cooling air coming to the following vehicle is reduced. If a point is reached where the following vehicle's cooling fan is required, the fan's power demand can eliminate fuel economy benefits or can even cause an increase in fuel consumption. The gap distance at which a cooling fan will activate depends on various factors, such as the design of the cooling system, the ambient temperature and altitude, the roadway grade, and amount of payload.

As explained below, and in accordance with the invention, a vehicle gap control process on-board each vehicle in a platoon determines that vehicle's gap spacing from the vehicle in front of it. This gap distance need not be uniform for the various vehicles in a platoon, especially if the vehicles are of different sizes and types.

Figure 2:
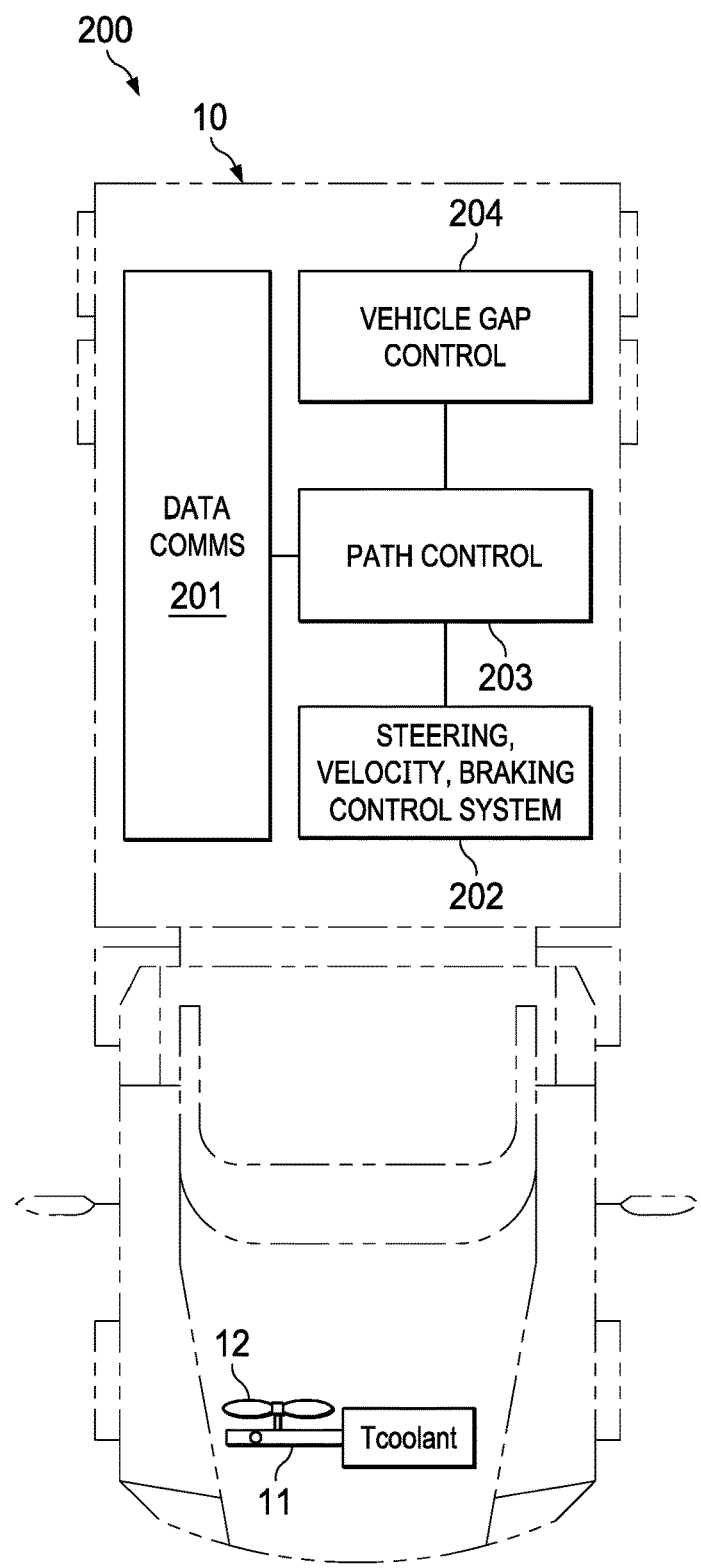
FIG. 2 illustrates a vehicle suitable for use in a platoon, with automated driving controls and including a gap distance control process in accordance with the invention.

FIG. 2 illustrates an example of a vehicle 10 suitable for use in a platoon that uses gap distance control in accordance with the invention. It is assumed that each vehicle 10 in the platoon has appropriate propulsion, braking, and steering mechanisms. It is further assumed that vehicle 10 has a coolant-based cooling system with a radiator 11 or other coolant system, as well as a cooling fan 12. For purposes of this description, "coolant" can be any heat transfer fluid, and the "coolant-based cooling system" can be any cooling system that circulates such fluid.

FIG. 2 further illustrates a vehicle control system 200 for the case in which vehicle 10 is autonomous. In more sophisticated autonomous driving systems, decisions can be made based on data communicated from one or more other vehicles, thus, control system 200 includes a data communications unit 201. However, as explained below, the gap control process may also be implemented in vehicles with less sophisticated vehicle control systems.

It is further assumed that each of the processes described in FIG. 2 is implemented with appropriate processing and memory hardware. The processes are further implemented with programming, hardware or software, to perform the tasks described.

In the example vehicle of FIG. 2, the vehicle control system 200 is for a fully autonomous vehicle and includes a vehicle control unit 202 and a path control process 203. However, as an alternative to being fully autonomous, vehicle 10 could easily be adapted to make driving and/or path movements based on data from a lead vehicle. It is also possible the vehicle 10 could have a human operator, with driving decisions made by or aided by vehicle control system 200. For a vehicle whose acceleration and braking are fully in control of a human, platooning may be impractical if safety issues prevent a small enough gap for fuel benefit. However, a human operated vehicle with a vehicle control system that implements adaptive cruise control may be suitable for platooning.

Vehicle control unit 202 controls the vehicle's steering, velocity, and braking, in accordance with the path designated by path control process 203 and gap control process 204. With regard to path control process 203, various techniques for navigating a path are known in the art of autonomous vehicles. The present invention is directed to control of the distance between vehicles in the platoon, using gap distance control process 204.

Figure 3:
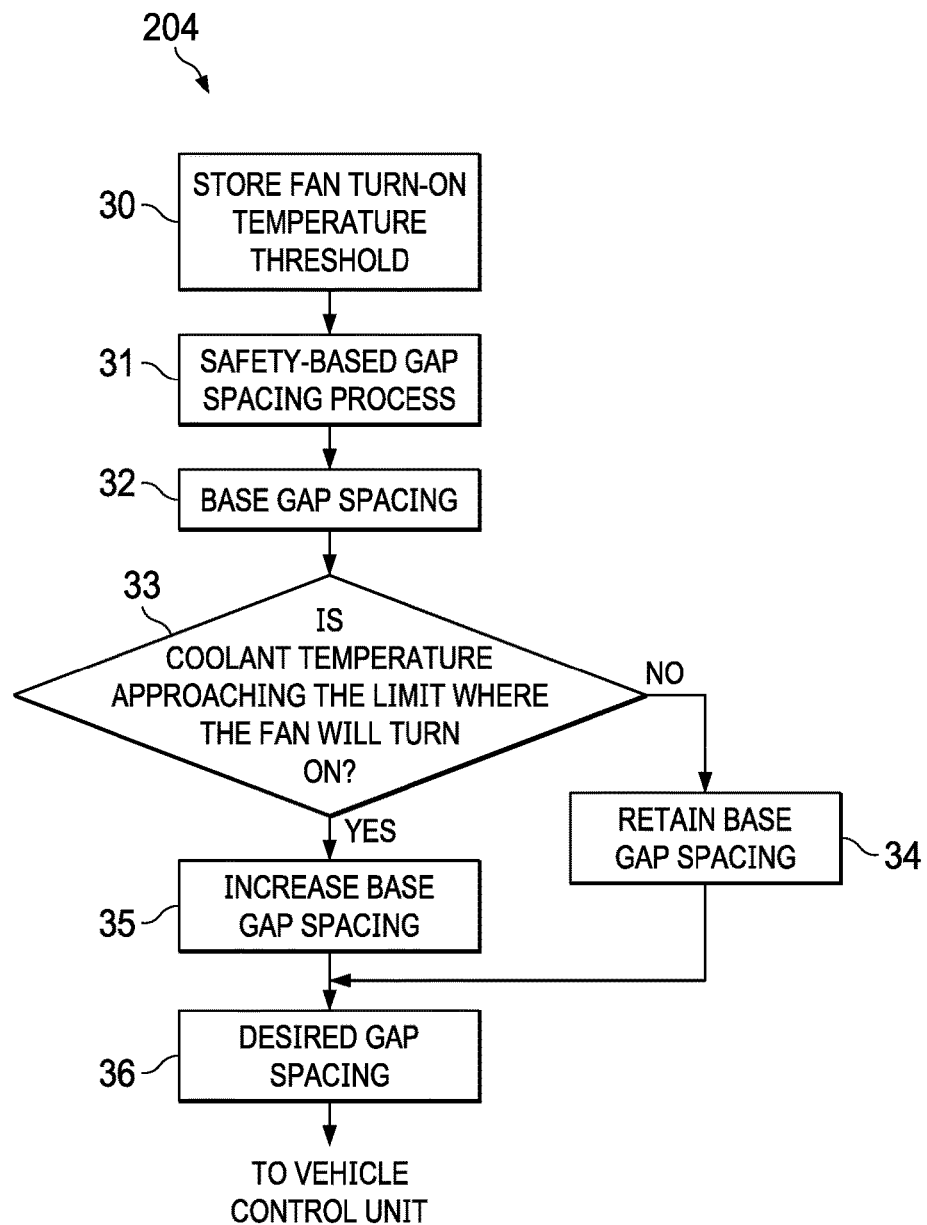
FIG. 3 illustrates the gap distance control process of FIG. 2.

FIG. 3 illustrates gap distance control process 204 in further detail. As explained below, process 204 determines a gap distance for each vehicle pair, based on the cooling system requirements of the following vehicle and any additional limitations such as safety. Process 204 applies to vehicles having a fan-assisted cooling system.

As indicated above, when the gap distance within a platoon decreases, larger and more heavy-duty vehicles are more likely to run into cooling issues than smaller vehicles. In typical highway driving, large vehicles have a higher average power demand. For example, to run a fully loaded semi-truck at 60 mph on level ground requires 150 to 200 horsepower, whereas a small car might require only 20 HP to run the same speed. Therefore, the large truck has much higher heat rejection requirements. Also, the wind shadow, or wake, behind a large truck (the area where limited cooling air is available to a following vehicle) is much larger for a large vehicle than for a small vehicle. Both of these factors (heat rejection and wind shadow) require a larger distance gap for one truck following another truck.

As indicated in Step 30, each vehicle stores a "fan turn-on temperature" threshold. This threshold is a temperature slightly below the coolant temperature at which the vehicle's cooling fan will turn on. Typically, the fan turn-on temperature is measured at the vehicle's radiator, but other measurement locations may be used. A measure commonly referred to as the "top tank temperature", measured at a location where hot coolant from the engine enters the radiator, may be used.

Step 31 is performing a safety-based gap distance process. A "base gap distance" is determined by determining the minimum distance the vehicle may follow behind a preceding vehicle in the platoon, based on the following vehicle's braking capability and other safety considerations. It is assumed that this process includes receiving appropriate input data representing the vehicle's current speed and distance from the vehicle ahead of it, and that the vehicle has appropriate sensors for determining this data. The result of Step 31 is a current base gap distance.

Step 33 is receiving data representing the vehicle's current coolant temperature and determining whether this temperature is approaching the vehicle's fan turn-on temperature. The comparison of temperatures can leave any desired margin below the fan turn-on temperature as a threshold.

Basically, the idea is to keep each vehicle's (except for a lead vehicle) coolant temperature just below the coolant temperature that would cause that vehicle's cooling fan to turn on. The cooling fan consumes power, thus running the fan has a fuel economy penalty. A closer following distance reduces the aerodynamic load on a truck, improving fuel economy until the point where the fan comes on. Each vehicle in the convoy uses its own coolant temperature to determine the spacing to the vehicle in front of it. Each vehicle in the convoy determines its own spacing, driven by its own cooling requirements. The most efficient platoon operation occurs when the vehicles follow as closely as possible, based on safety considerations and keeping the vehicle coolant temperature of each following vehicle just below the point where the cooling fan is required.

Referring again to FIG. 2, each platoon vehicle 200 is equipped with a thermometer or other means for measuring the coolant temperature. The current coolant temperature is typically measured at the vehicle's radiator, but any measure may be used if it can be used for a reliable comparison to the stored fan turn-on temperature described above.

Step 34 is performed if the coolant temperature is below the fan turn-on temperature threshold. In this case, the vehicle is operated so as to maintain the base gap distance.

Step 35 is performed if the coolant temperature is at or above the fan turn-on temperature threshold. In this case, the vehicle is operated to increase the base gap distance. In most cases, reducing engine power will be adequate to increase the gap distance, but in rare cases, braking may be required. The amount of increase to the gap distance is controlled by a coolant temperature feed-back loop built in to the process of Step 33, combined with the safety-based process of Step 31.

Referring again to FIG. 2, for implementation in a platoon vehicle already equipped with a primary vehicle control system 202, Steps 30 and 33 are performed by gap control process 204. The vehicle control process 202 determines the base gap distance, receives data from gap control process 204 to determine whether or not to maintain the base gap distance, and operates the vehicle accordingly.

The gap distance control process 204 is repeated at desired intervals. The interval period may be constant, or it may be decreased or increased depending on road conditions. For example, conditions such as uphill travel, travel in hot climates, or frequent changing of vehicles in the platoon, may call for a more frequent monitoring of gap distances.

The above-described gap distance monitoring process is useful for most vehicles, in that most vehicles from pickup trucks and large SUVs on up to semi-trucks typically have engine-driven cooling fans or relatively powerful electric-driven fans. Lighter vehicles generally have less powerful electric cooling fans, and may run into safety limits on following distance before the fan activates. However, there may be exceptions to this if a light vehicle is following a much larger vehicle.

Referring again to FIG. 2, although the gap control process 204 is shown described herein in use with an autonomous vehicle, semi-autonomous or human operated vehicles can also benefit from the gap distance control process. For example, a human operator driving in a platoon could receive data informing the operator of a suggested gap distance.

What is claimed is:

1. A method of determining the optimum gap distance for a following vehicle in a platoon, the vehicle having a cooling fan and a coolant-based cooling system, comprising:
   storing a fan turn-on threshold temperature, representing a coolant temperature at or above which the cooling fan will become activated;
   determining a base gap distance, representing a gap distance from another vehicle in front of the vehicle, the base gap distance based on the following vehicle's braking capability;
   receiving a current coolant temperature value;
   comparing the coolant temperature value to the fan turn-on threshold temperature;
   if the coolant temperature is below the fan turn-on threshold temperature, operating the vehicle to maintain the base gap distance; and
   if the coolant temperature is at or above the fan turn-on threshold temperature, operating the vehicle to increase the base gap distance such that the fan is not activated; and
   using a feedback loop of repeated coolant temperature measurements to determine the amount of increase of the base gap distance; and
   wherein coolant temperature is the only parameter used for predicting fan activation.

2. The method of claim 1, wherein the safety considerations comprise at least the minimum gap distance required to avoid a collision with a preceding vehicle during a braking event.

3. The method of claim 1, wherein the step of operating the vehicle to increase the base gap distance is performed by reducing engine power.

4. The method of claim 1, wherein the step of operating the vehicle to increase the base gap distance is performed by applying braking.

5. The method of claim 1, wherein the coolant-based cooling system has a radiator, and the coolant temperature is measured with a thermometer at the radiator.

* * * * *